United States Patent
Nakazawa et al.

[11] Patent Number: 6,157,524
[45] Date of Patent: Dec. 5, 2000

[54] METHOD OF MANUFACTURING SPIN-VALVE TYPE THIN FILM ELEMENT HAVING REMAGNETIZED BIAS LAYER

[75] Inventors: Yukie Nakazawa; Masamichi Saito, both of Niigata-ken, Japan

[73] Assignee: Alps Electric Co., Ltd., Tokyo, Japan

[21] Appl. No.: 09/191,088

[22] Filed: Nov. 12, 1998

[30] Foreign Application Priority Data

Dec. 9, 1997 [JP] Japan .................................. 9-339149

[51] Int. Cl.⁷ ...................................................... G11B 5/39
[52] U.S. Cl. ...................................................... 360/324.12
[58] Field of Search .................................. 360/113, 126, 360/324.12; 324/252

[56] References Cited

U.S. PATENT DOCUMENTS

| | | | |
|---|---|---|---|
| 5,018,037 | 5/1991 | Krounbi et al. | 360/113 |
| 5,079,035 | 1/1992 | Krounbi et al. | 427/130 |
| 5,159,513 | 10/1992 | Dieny et al. | 360/113 |
| 5,206,590 | 4/1993 | Dieny et al. | 324/252 |
| 5,287,238 | 2/1994 | Baumgart et al. | 360/113 |
| 5,373,238 | 12/1994 | McGuire et al. | 324/252 |
| 5,691,864 | 11/1997 | Saito | 360/113 |
| 5,768,067 | 6/1998 | Saito et al. | 360/113 |
| 5,784,225 | 7/1998 | Saito et al. | 360/113 |
| 5,905,611 | 5/1999 | Yoda et al. | 360/113 |
| 5,974,657 | 11/1999 | Fox et al. | 29/603.08 |
| 5,991,125 | 11/1999 | Iwasaki et al. | 360/113 |
| 5,992,004 | 11/1999 | Sato et al. | 29/603.14 |

*Primary Examiner*—Jefferson Evans
*Attorney, Agent, or Firm*—Brinks Hofer Gilson & Lione

[57] ABSTRACT

A spin-valve type thin film element includes an antiferromagnetic layer; a fixed magnetic layer formed so as to be in contact with the antiferromagnetic layer, the magnetization direction of the fixed magnetic layer being fixed by the exchange anisotropic magnetic field between the fixed magnetic layer and the antiferromagnetic layer; a free magnetic layer formed on the fixed magnetic layer with a nonmagnetic conductive layer therebetween; a bias layer for setting the magnetization direction of the free magnetic layer in the direction perpendicular to the magnetization direction of the fixed magnetic layer; and a conductive layer for applying a sensing current into the fixed magnetic layer, the nonmagnetic conductive layer, and the free magnetic layer. The magnetization of the fixed magnetic layer in the central region is fixed in the height direction, and the magnetization of the fixed magnetic layer in the end regions is fixed in the direction inclined in relation to the height direction. A method of manufacturing such a spin-valve type thin film element is also disclosed.

10 Claims, 7 Drawing Sheets

METHOD OF MANUFACTURING SPIN-VALVE TYPE THIN FILM ELEMENT HAVING REMAGNETIZED BIAS LAYER

BACKGROUND OF THE INVENTION

1. Field of the Invention

The present invention relates to a spin-valve type thin film element in which electrical resistance changes in response to the relationship between the magnetization direction of a fixed or pinned magnetic layer and the magnetization direction of a free magnetic layer which is influenced by an external magnetic field. More particularly, the invention relates to a spin-valve type thin film element in which the magnetization of a fixed magnetic layer can be properly fixed in the height direction and to a method of manufacturing such a spin-valve type thin film element.

2. Description of the Related Art

Figure 7:
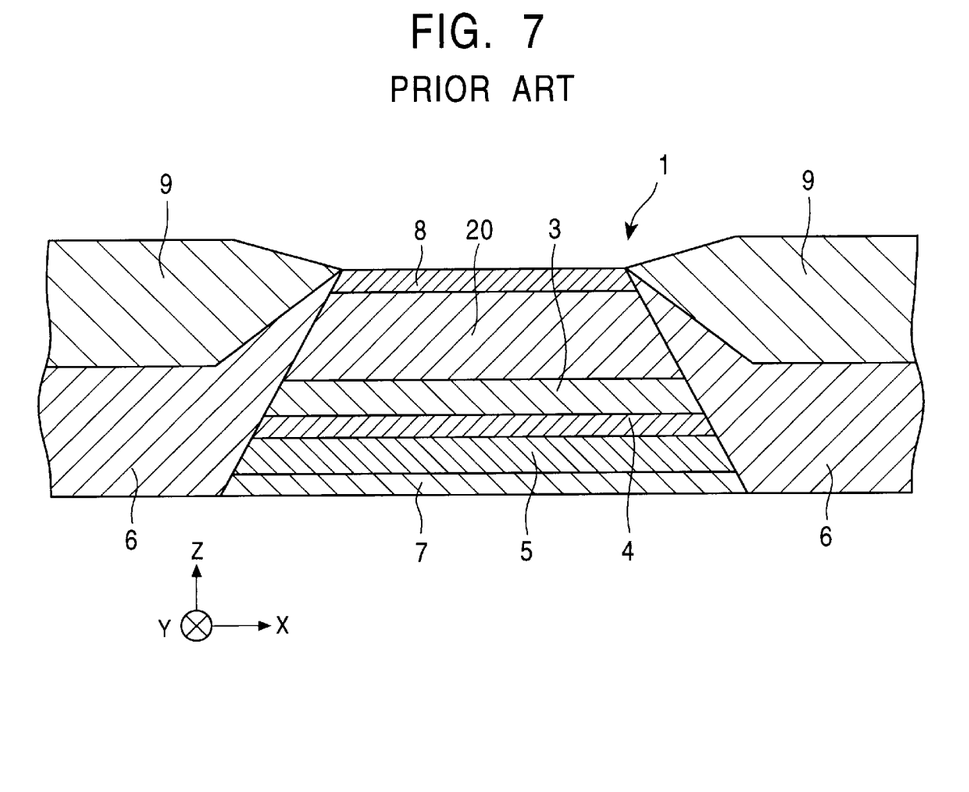
FIG. 7 is a sectional view of a conventional spin-valve type thin film element, taken from the air bearing surface.
Figure 8:
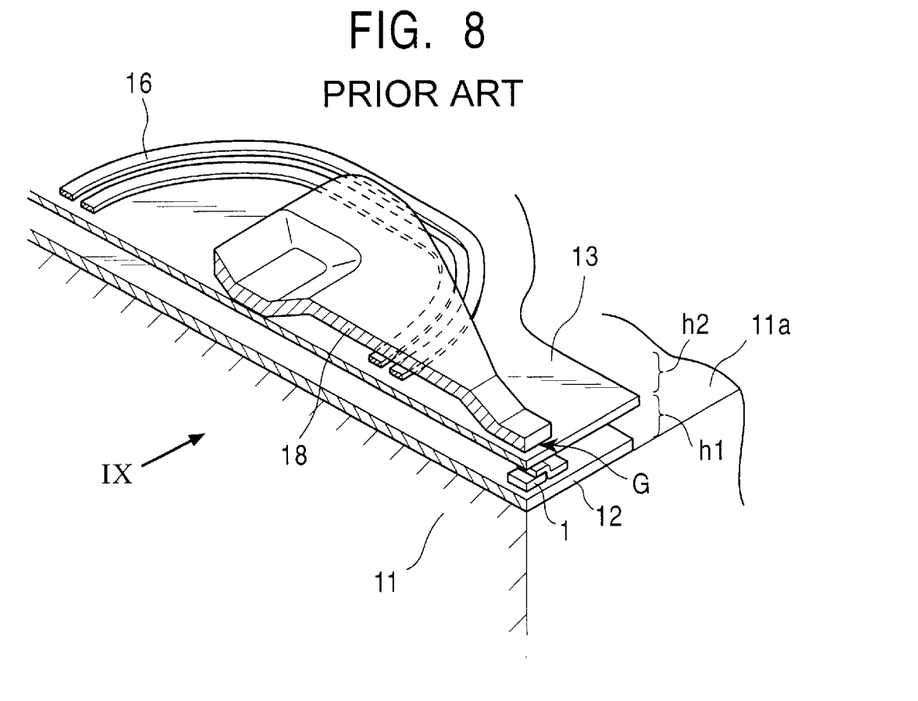
FIG. 8 is a partial perspective view which shows a shape of a thin film magnetic head formed on a slider.

FIG. 7 is a sectional view of a spin-valve type thin film element (spin-valve type thin film magnetic head), taken near the air bearing surface (ABS), which detects a recording magnetic field from a recording medium such as a hard disk. FIG. 8 is a perspective view which schematically shows the entire structure of a thin-film magnetic head provided on a slider.

A spin-valve type thin film element 1 shown in FIG. 7 is a kind of giant magnetoresistive (GMR) element which uses a giant magnetoresistance effect, and is used for detecting a recording magnetic field from a recording medium such as a hard disk.

As shown in FIG. 7, in the spin-valve type thin film element 1, a free magnetic layer 5, a nonmagnetic conductive layer 4, a fixed magnetic layer 3, and an antiferromagnetic layer 20 are deposited in that order, and hard magnetic bias layers 6 and 6 are formed on both sides thereof.

Generally, an iron—manganese (Fe—Mn) alloy film or iridium—manganese (Ir—Mn) alloy film is used for the antiferromagnetic layer 20, a nickel—iron (Ni—Fe) alloy film is used for the fixed magnetic layer 3 and the free magnetic layer 5, a copper (Cu) film is used for the nonmagnetic conductive layer 4, and a cobalt—platinum (Co—Pt) alloy film is used for the hard magnetic bias layers 6 and 6. Numerals 7 and 8 represent an under layer and a protective layer, respectively, composed of a nonmagnetic material such as tantalum (Ta).

As shown in FIG. 7, the fixed magnetic layer 3 and antiferromagnetic layer 20 are formed so as to be in contact with each other. By depositing films in a magnetic field, an exchange anisotropic magnetic field is caused by exchange coupling at the interface between the fixed magnetic layer 3 and the antiferromagnetic layer 20, and thus the fixed magnetic layer 3 is put into a single magnetic domain state and the magnetization direction of the fixed magnetic layer 3 is fixed in the Y direction (height direction; the direction of a leakage magnetic field from a recording medium).

After depositing six layers from the under layer 7 to the protective layer 8 (hereinafter referred to as a "laminate"), both sides of the laminate are scraped off so that the laminate has inclined sides by an etching process such as by ion-milling, and hard magnetic bias layers 6 and 6 are deposited on both sides. The hard magnetic bias layers 6 and 6 are magnetized in the X direction (track width direction).

The magnetization direction of the free magnetic layer 5 is set in the X direction under the influence of the hard magnetic bias layers 6 and 6 which are magnetized in the X direction.

In the spin-valve type thin film element 1, a sensing current is applied from conductive layers 9 and 9 formed on the hard magnetic bias layers 6 and 6 into the fixed magnetic layer 3, nonmagnetic conductive layer 4, and the free magnetic layer 5. The driving direction of a recording medium such as a hard disk is in the Z direction, and if a leakage magnetic field from the recording medium is applied in the Y direction, the magnetization of the free magnetic layer 5 changes from the X direction to the Y direction. Because of the relationship between the change in the magnetization direction in the free magnetic layer 5 and the fixed magnetization direction of the fixed magnetic layer 3, the electrical resistance changes, and the leakage magnetic field from the recording medium is detected by the voltage change based on the change in the electrical resistance.

As shown in FIG. 8, the spin-valve type thin film element 1 is formed on a magnetic lower shield layer 12 formed on an end 11a on the trailing side of a slider 11 with a nonmagnetic lower gap layer (not shown in the drawing) therebetween.

A magnetic upper shield layer 13 is formed on the spin-valve type thin film element 1 with an upper gap layer (not shown in the drawing) therebetween. The layers from the lower shield layer 12 to the upper shield layer 13 function as a reading head h1.

The upper shield layer 13 also functions as a lower core layer for an inductive type magnetic head h2 (for writing).

Figure 9:
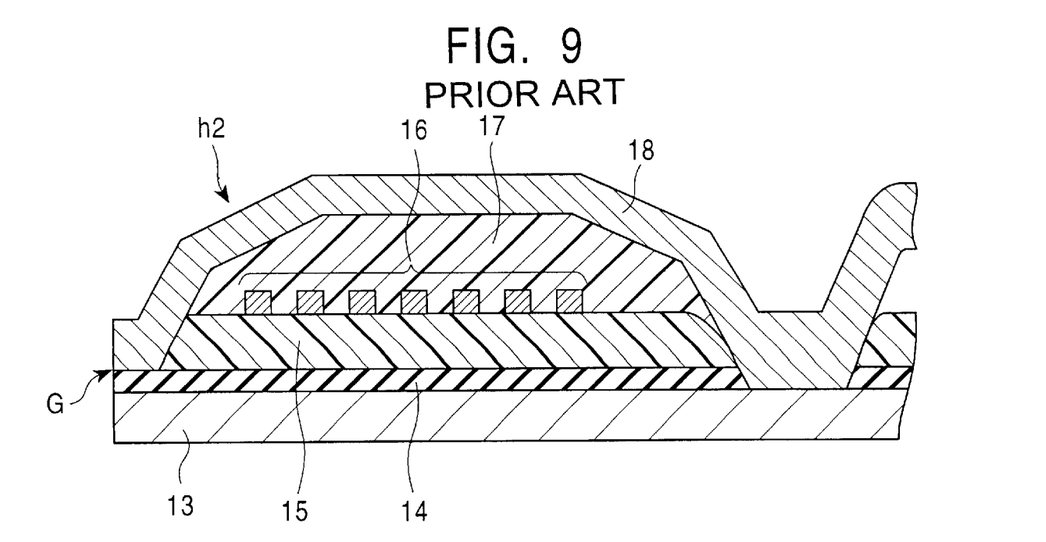
FIG. 9 is a partial sectional view which shows the structure of an inductive type magnetic head.

In the inductive type magnetic head h2, as shown in FIG. 9, a gap layer 14 composed of a nonmagnetic material such as aluminum oxide ($Al_2O_3$) is provided on the lower core layer 13, and a resist layer 15 is formed on the gap layer 14.

A coil layer 16 spirally formed (refer to FIG. 8) is provided on the resist layer 15, and a resist layer 17 is formed on the coil layer 16.

An upper core layer 18 is formed by plating a magnetic material such as a permalloy on the resist layer 17.

In the inductive type magnetic head h2, a recording current is applied into the coil layer 16, and a recording magnetic field is applied onto the upper core layer 18 and the lower core layer 13 from the coil layer 16. A leakage magnetic field between the lower core layer 13 and the upper core layer 18 at a magnetic gap G section enables magnetic signals to be written into a recording medium such as a hard disk.

As described above, after the laminate including the free magnetic layer 5, the nonmagnetic conductive layer 4, the fixed magnetic layer 3, and the antiferromagnetic layer 20 is formed, that is, the antiferromagnetic layer 20 is deposited in a magnetic field to generate an exchange anisotropic magnetic field, hard magnetic bias layers 6 and 6 are formed on both sides of the laminate, and then the hard magnetic bias layers 6 and 6 are magnetized in the X direction (track width direction).

Next, the inductive type magnetic head h2 shown in FIG. 9 is formed on the spin-valve type thin film element 1.

In the fabrication process of the inductive type magnetic head h2, in order to increase insulating properties of the resist layers 15 and 17 shown in FIG. 9, after forming the resist layers 15 and 17, the resist layers 15 and 17 must be heat-treated for curing.

However, if the resist layers 15 and 17 are heat-treated for curing, the magnetization of the fixed magnetic layer 3 that has been fixed in the Y direction in FIG. 7 fluctuates in the X direction, and playback characteristics of the spin-valve type thin film element 1 deteriorate.

The problem described above results from the relationship between the blocking temperature of an antiferromagnetic material used as the antiferromagnetic layer 20 and the heating temperature for curing the resist layers, and the magnetization direction of the hard magnetic bias layer 6.

The conventional antiferromagnetic layer 20 is composed of an Fe—Mn alloy film or an Ir—Mn alloy film. The Fe—Mn alloy layer has a blocking temperature (temperature at which an exchange anisotropic magnetic field disappears) of approximately 150° C. and the Ir—Mn alloy film has a blocking temperature of approximately 260° C.

Figure 10A:
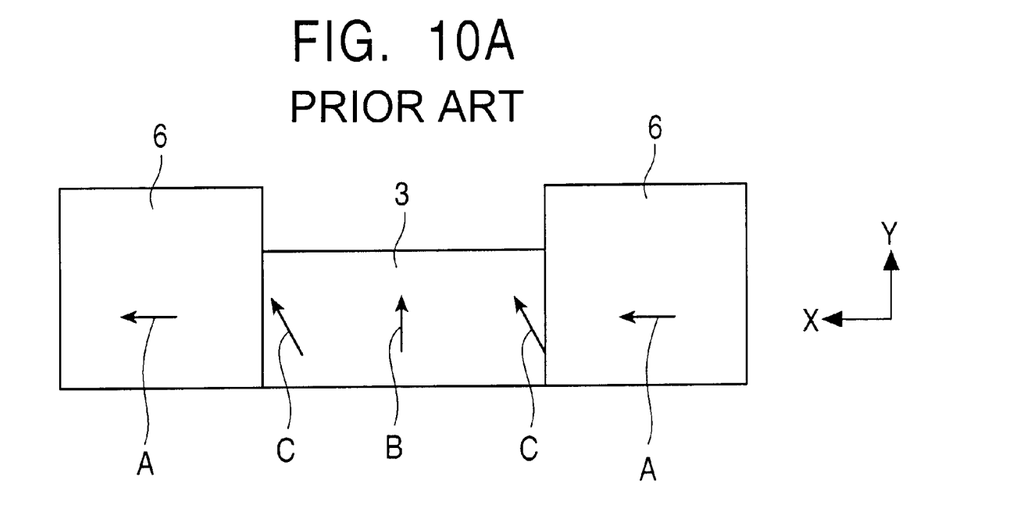
FIGS. 10A and 10B are schematic diagrams which show the magnetization directions of a fixed magnetic layer and a hard magnetic bias layer in a conventional art viewed from directly above, before the resist curing step (FIG. 10A) and after the resist curing step (FIG. 10B).
Figure 10B:
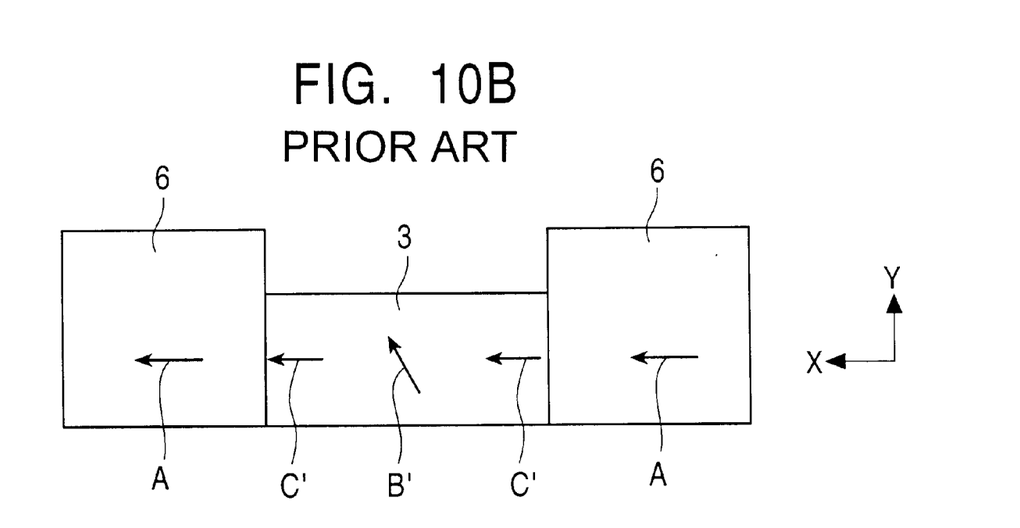

FIGS. 10A and 10B are schematic diagrams which show the fixed magnetic layer 3 and the hard magnetic bias layer 6 viewed from directly above. FIG. 10A shows the magnetization directions of the fixed magnetic layer 3 and the hard magnetic bias layer 6 before the resist curing step, and FIG. 10B shows the magnetization directions of the fixed magnetic layer 3 and the hard magnetic bias layer 6 after the resist curing step.

As shown in FIG. 10A, before the resist curing step (before heat-treatment), a magnetization B in the central region of the fixed magnetic layer 3, is fixed in the Y direction (height direction) by an exchange anisotropic magnetic field in the Y direction caused in the interface with the antiferromagnetic layer 20.

However, a magnetization C in the end regions of the fixed magnetic layer 3 is easily influenced by a magnetization A in the X direction (track width direction) of the adjacent hard magnetic bias layer 6, and thus the magnetization C is fixed in the direction inclined in the X direction in relation to the Y direction.

In the state of magnetization shown in FIG. 10A, heat-treatment is performed for curing the resist layers at approximately 250° C. When the antiferromagnetic layer 20 (refer to FIG. 7) is formed of an Fe—Mn alloy film, the heating temperature is higher than the blocking temperature (approximately 150° C.) of the Fe—Mn alloy film, or when the antiferromagnetic layer 20 is formed of an Ir—Mn alloy film, the heating temperature is substantially the same as the blocking temperature (approximately 260° C.) of the Ir—Mn alloy film.

However, when heat-treatment is performed at approximately 250° C. for curing the resist layers 15 and 17, the exchange anisotropic magnetic field in the Y direction disappears, and thus the fixed magnetic layer 3 is strongly influenced by the hard magnetic bias layer 6 that is magnetized in the X direction.

Therefore, when the temperature is decreased to ambient temperature and an exchange magnetic coupling is regenerated at the interface between the fixed magnetic layer 3 and the antiferromagnetic layer 20, the anisotropy disperses, and as shown in FIG. 10B, magnetizations C' and C' in the end regions of the fixed magnetic layer 3 that are strongly influenced by the hard magnetic bias layer 6 are fixed in the X direction, and also, the magnetization B' in the central region of the fixed magnetic layer 3 is fixed in the direction inclined to the X direction in relation to the Y direction.

As described above, the magnetization of the fixed magnetic layer 3 of the spin-valve type thin film element 1 is not properly fixed in the Y direction in the entire region, and thus playback characteristics deteriorates, for example, the output of the head decreases, or satisfactory asymmetry cannot be obtained. The word "asymmetry" means the vertical asymmetry of the regenerated output waveform.

SUMMARY OF THE INVENTION

The present invention overcomes the problems noted above with respect to the conventional art. It is an object of the present invention to provide a spin-valve type thin film element in which the magnetization of a fixed magnetic layer is properly fixed in the height direction, even after the resist curing step, so that good playback characteristics can be obtained, and a method of manufacturing such a spin-valve type thin film element.

In accordance with the present invention, a spin-valve type thin film element includes an antiferromagnetic layer; a fixed magnetic layer formed so as to be in contact with the antiferromagnetic layer, the magnetization direction of the fixed magnetic layer being fixed by the exchange anisotropic magnetic field between the fixed magnetic layer and the antiferromagnetic layer; a free magnetic layer formed over and/or under the fixed magnetic layer with a nonmagnetic conductive layer therebetween; a bias layer for setting the magnetization direction of the free magnetic layer in the direction perpendicular to the magnetization direction of the fixed magnetic layer; and a conductive layer for applying a sensing current into the fixed magnetic layer, the nonmagnetic conductive layer, and the free magnetic layer. The magnetization of the fixed magnetic layer in the central region is fixed in the height direction, and the magnetization of the fixed magnetic layer in the end regions is fixed in the direction inclined in relation to the height direction.

In accordance with the present invention, preferably, the antiferromagnetic layer is composed of a Pt—Mn alloy.

Instead of the Pt—Mn alloy, an X—Mn alloy, where X is an element selected from the group consisting of Pd, Rh, Ru, Ir, and Os, or a Pt—Mn—X alloy, where X is an element selected from the group consisting of Ni, Pd, Rh, Ru, Ir, Cr, and Co, may be used for the antiferromagnetic layer.

Also, in accordance with the present invention, a method of manufacturing a spin-valve type thin film element includes the steps of:

forming a laminate including an antiferromagnetic layer, a fixed magnetic layer, a nonmagnetic conductive layer, and a free magnetic layer, and fixing the magnetization of the fixed magnetic layer in the height direction by exchange coupling with the antiferromagnetic layer;

forming a bias layer on both sides of the laminate, and magnetizing the bias layer in the height direction;

heating the laminate and the bias layer; and applying a magnetic field in the track width direction after the heating step to remagnetize the bias layer in the track width direction.

For example, the heating step is performed in order to cure a resist layer that functions as an insulating layer for an inductive type magnetic head to be formed on a thin film element including the laminate and the bias layer.

In the present invention, the heating step is preferably performed at a temperature lower than the blocking temperature of the antiferromagnetic layer.

In accordance with the present invention, the antiferromagnetic layer is preferably formed of a Pt—Mn alloy film so that the blocking temperature of the antiferromagnetic layer is higher than the heating temperature.

Instead of the Pt—Mn alloy, an X—Mn alloy, where X is an element selected from the group consisting of Pd, Rh, Ru, Ir, and Os, or a Pt—Mn—X alloy, where X is an element selected from the group consisting of Ni, Pd, Rh, Ru, Ir, Cr, and Co, may be used for the antiferromagnetic layer.

Figure 5:
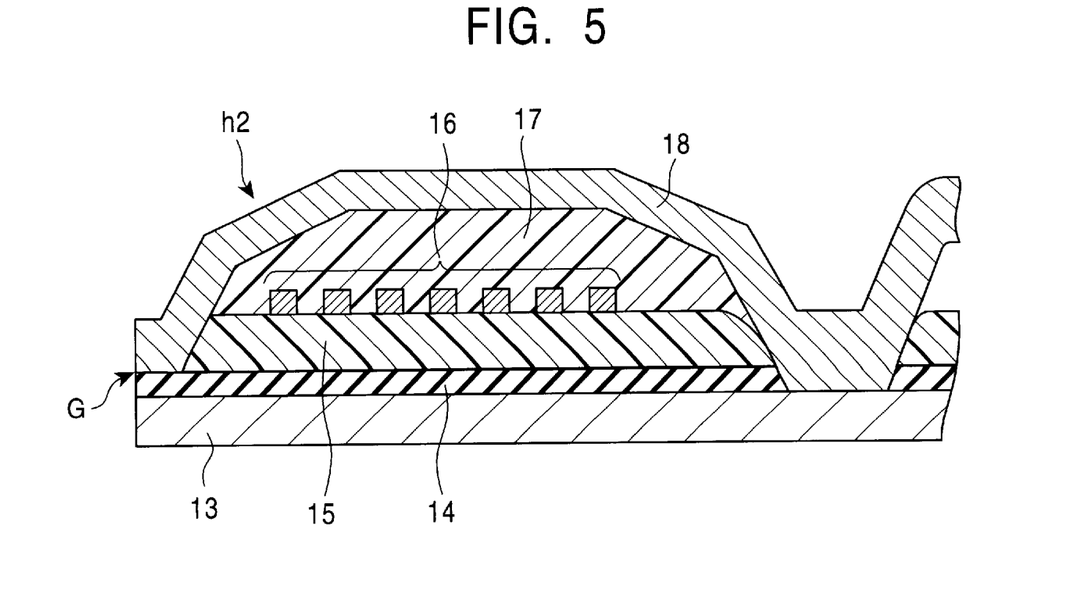
FIG. 5 is a partial sectional view of an inductive type magnetic head shown in FIG. 4, taken from the side shown by an arrow.

With respect to a so-called "combined thin film magnetic head", in which an inductive type magnetic head h2 shown in FIG. 5 is deposited on a spin-valve type thin film element, a heating step is performed at approximately 250° C. in order to cure resist layers 15 and 17 to maintain the insulating properties of core layers 13 and 18 of a coil layer 16.

In the present invention, the hard magnetic bias layer before the resist curing step is magnetized in the height direction so that the magnetization of the fixed magnetic layer in the spin-valve type thin film element is properly fixed in the height direction after the resist curing step (after heating).

Accordingly, even if the exchange anisotropic magnetic field generated in the interface between the fixed magnetic layer and the antiferromagnetic layer disappears or diminishes because of heating in the resist curing step, the magnetization of the fixed magnetic layer is influenced by the hard magnetic bias layer that is magnetized in the height direction.

When the temperature is decreased to ambient temperature and an exchange magnetic coupling is regenerated at the interface between the fixed magnetic layer and the antiferromagnetic layer, an exchange anisotropic magnetic field caused by the exchange coupling is properly directed in the height direction, and the magnetization of the fixed magnetic layer is fixed in the height direction.

Then, since the hard magnetic bias layer is remagnetized in the track width direction, the magnetization in the end regions of the fixed magnetic layer is inclined in the track width direction under the influence of the hard magnetic bias layer, however, the magnetization in the central region of the fixed magnetic layer is properly fixed in the height direction by the exchange anisotropic magnetic field directed in the height direction. Therefore, higher output of the head and better asymmetry can be obtained in comparison with the conventional art.

In particular, in accordance with the present invention, a Pt—Mn alloy film is preferably used as the antiferromagnetic layer.

The Pt—Mn alloy film has a blocking temperature of approximately 380° C., which is higher than the heating temperature (approximately 250° C.) in the resist curing step.

Therefore, if a Pt—Mn alloy film is used as the antiferromagnetic layer, the exchange anisotropic magnetic field does not disappear even by heating in the resist curing step, and the magnetization of the fixed magnetic layer can be properly fixed in the height direction, and also, higher output of the head and better asymmetry can be obtained in comparison with the case in which an Fe—Mn alloy film or an Ir—Mn alloy film is used as the antiferromagnetic layer.

By using a method of manufacturing a spin-valve type thin film element in accordance with the present invention, even when an antiferromagnetic material such as an Fe—Mn alloy film or an Ir—Mn alloy film having a blocking temperature that is lower than the heating temperature in the resist curing step is used as the antiferromagnetic layer, playback characteristics such as the output of the head and asymmetry can be improved.

DESCRIPTION OF THE PREFERRED EMBODIMENT

Figure 1:
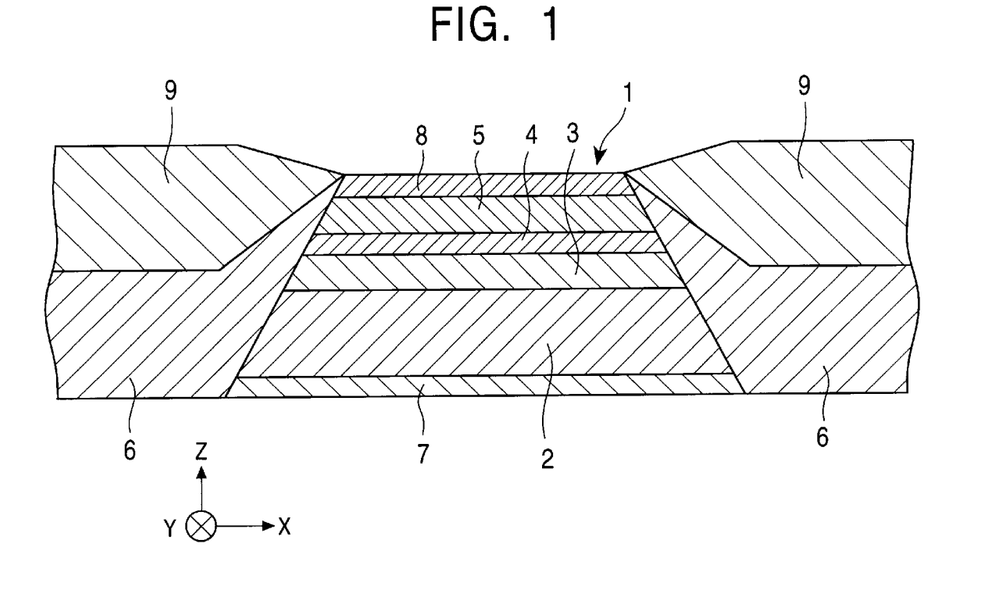
FIG. 1 is a sectional view of a spin-valve type thin film element as a first embodiment of the present invention, taken from the air bearing surface.
Figure 2:
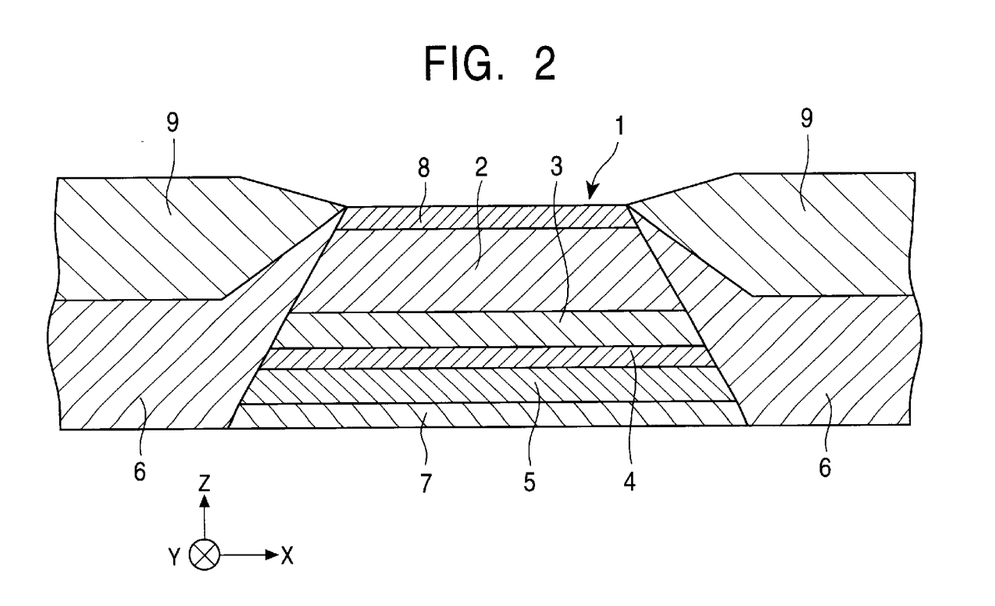
FIG. 2 is a sectional view of a spin-valve type thin film element as a second embodiment of the present invention, taken from the air bearing surface.
Figure 3:
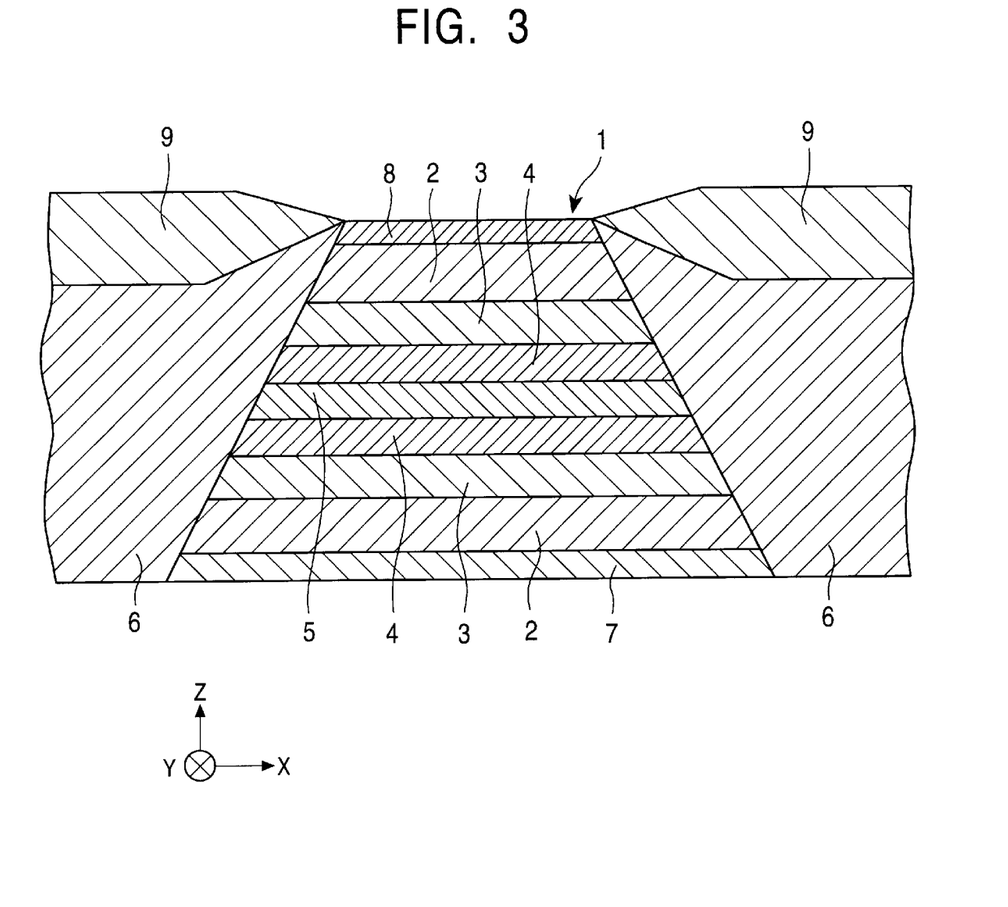
FIG. 3 is a sectional view of a spin-valve type thin film element as a third embodiment of the present invention, taken from the air bearing surface.
Figure 4:
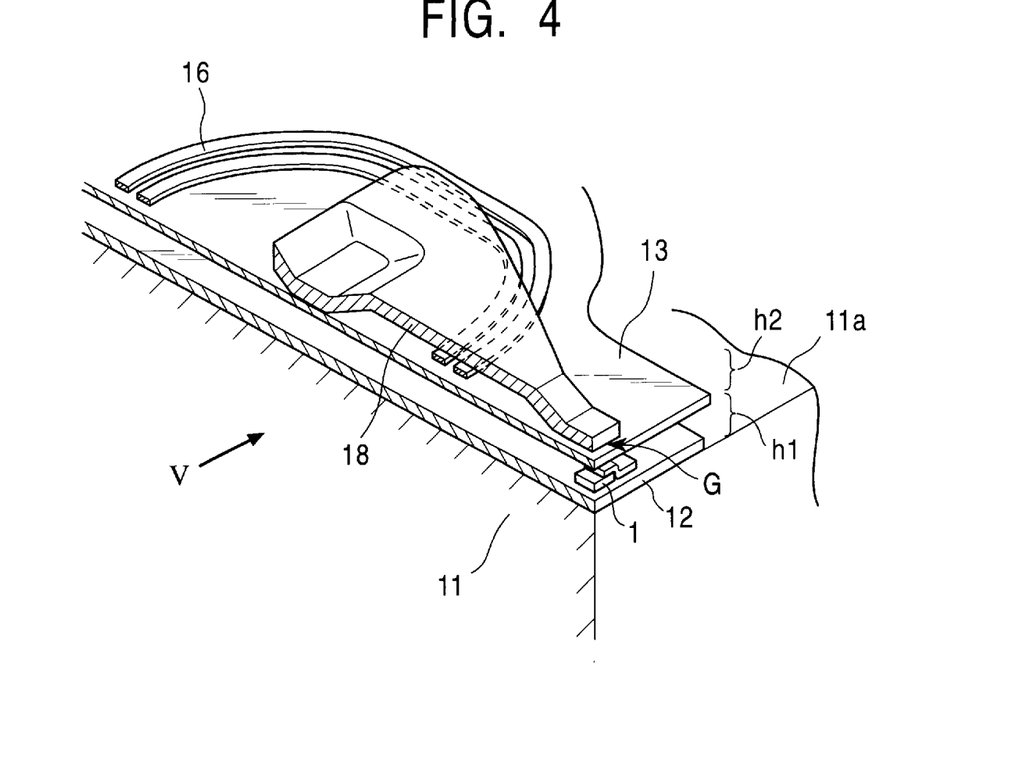
FIG. 4 is a partial perspective view which shows the shape of a thin film magnetic head formed on a slider.

Spin-valve type thin film elements 1 shown in FIGS. 1 through 3 are mounted, for example, on the trailing end 11a of a floating type slider 11 shown In FIG. 4 for detecting a recording magnetic field from a hard disk or the like.

In FIGS. 1 through 3, an under layer 7 composed of a nonmagnetic material such as tantalum (Ta) is formed at the bottom.

In FIG. 1, an antiferromagnetic layer 2, a fixed magnetic layer (pinned magnetic layer) 3, a nonmagnetic conductive layer 4, and a free magnetic layer 5 are deposited in that order on the under layer 7.

The deposition may be in the reversed order, as shown in FIG. 2, in which a free magnetic layer 5, a nonmagnetic conductive layer 4, a fixed magnetic layer 3, and an antiferromagnetic layer 2 are deposited on the under layer 7.

Alternatively, a spin-valve type thin film element may be of a dual type, as shown in FIG. 3, in which a nonmagnetic conductive layer 4, a fixed magnetic layer 3, an antiferromagnetic layer 2 is deposited in that order on each surface of a free magnetic layer 5.

As shown in FIGS. 1 through 3, a protective layer 8 composed of a nonmagnetic material such as Ta is formed at the top.

Six layers from the under layer 7 to the protective layer 8 (hereinafter referred to as a "laminate") shown in FIGS. 1 and 2, and nine layers from the under layer 7 to the protective layer 8 (hereinafter referred to as a "laminate") shown in FIG. 3, have inclined sides, and a hard magnetic bias layer 6 and a conducive layer 9 are deposited on each side of the laminate.

Next, a material for each layer will be described.

In the present invention, the antiferromagnetic layer 2 is composed of a platinum—manganese (Pt—Mn) alloy film. The Pt—Mn alloy film has a higher blocking temperature than that of an Fe—Mn alloy film, an Ir—Mn alloy film, or the like. While the Fe—Mn alloy film has a blocking temperature of approximately 150° C. and the Ir—Mn alloy film has a blocking temperature of approximately 260° C., the Pt—Mn alloy film has a blocking temperature of approximately 380° C.

Also, if the Pt—Mn alloy film is used as the antiferromagnetic layer 2, an exchange anisotropic magnetic field can be generated at the interface with the fixed magnetic layer 3, in whichever case when the antiferromagnetic layer 2 is formed under the fixed magnetic layer as shown in FIG. 1, or when the antiferromagnetic layer 2 is formed over the fixed magnetic layer as shown in FIG. 2.

That is, the Pt—Mn alloy film is one of the most suitable antiferromagnetic materials for the dual spin-valve type thin film element shown in FIG. 3 in which the antiferromagnetic layer 2 is formed on both surfaces of the fixed magnetic layer 3.

On the other hand, with respect to the Fe—Mn alloy film or the Ir—Mn alloy film, as shown in FIG. 7, only when the antiferromagnetic layer 20 is formed on the upper surface of the fixed magnetic layer 3, an exchange anisotropic magnetic field occurs at the interface with the fixed magnetic layer 3.

Additionally, the Pt—Mn alloy film has excellent characteristics as an antiferromagnetic material, such as good thermal resistance and a large exchange anisotropic magnetic field (Hex).

In the present invention, instead of a Pt—Mn alloy, an X—Mn alloy, where X is an element selected from the group consisting of Pd, Ru, Ir, Os, and Rh, or a Pt—Mn—X alloy, where X is an element selected from the group consisting of Ni, Pd, Rh, Ru, Ir, Cr, and Co, may be used for the antiferromagnetic layer 2.

With respect to the composition ratio of the Pt—Mn alloy and the X—Mn alloy, preferably, (Pt, or X): Mn=1:9 to 3:7, or 1:0.7 to 1:1.3, and more preferably, 1:1.

In the present invention, the fixed magnetic layer 3 and the free magnetic layer 5 is composed of a Ni—Fe alloy film, a Co—Fe alloy film, a Co—Fe—Ni alloy film, or a Co film.

The nonmagnetic conductive layer 4 is composed of a Cu film, the hard magnetic bias layers 6 and 6 are composed of, for example, a cobalt—platinum (Co—Pt) alloy film, or a cobalt—chromium—platinum (Co—Cr—Pt) alloy film, and the conductive layer 9 is composed of chromium (Cr), tantalum (Ta), or the like.

As shown in FIGS. 1 through 3, the fixed magnetic layer 3 is formed so as to be in contact with the antiferromagnetic layer 2. In such a state, by heat-treating while applying a magnetic field in the Y direction (height direction; the direction of a leakage magnetic field from a recording medium), an exchange anisotropic magnetic field is produced at the interface between both layers, and thus the fixed magnetic layer 3 is put into a single magnetic domain state and the magnetization direction of the fixed magnetic layer 3 is fixed in the Y direction.

The hard magnetic bias layers 6 and 6 are magnetized in the X direction (track width direction), and the magnetization direction of the free magnetic layer 5 is set in the X direction under the influence of the hard magnetic bias layers 6 and 6.

Figure 6A:
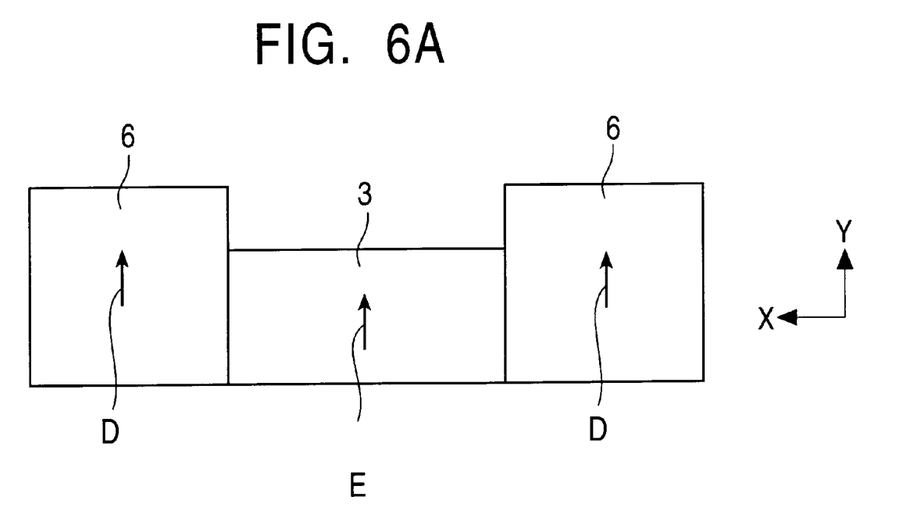
FIGS. 6A and 6B are schematic diagrams which show the magnetization directions of a fixed magnetic layer and a hard magnetic bias layer in the present invention viewed from directly above, before the resist curing step (FIG. 6A) and after the resist curing step (FIG. 6B)
Figure 6B:
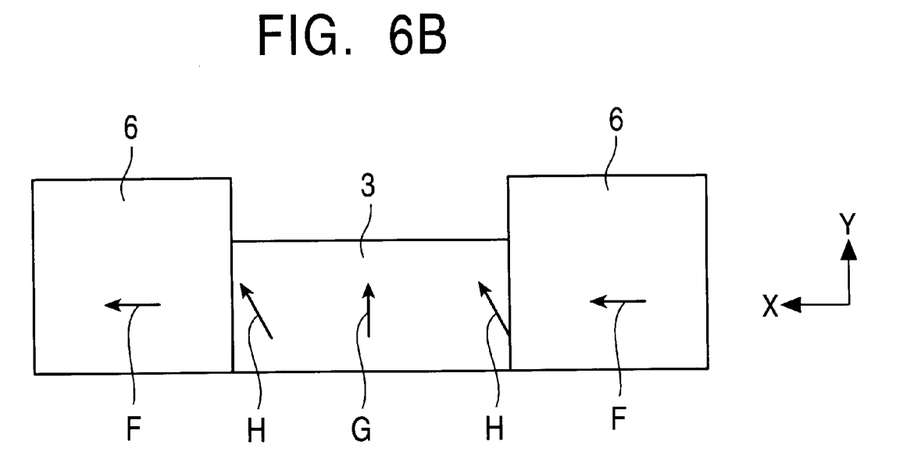

FIG. 6B is a schematic diagram of a fixed magnetic layer 3 and a hard magnetic bias layer 6 viewed from directly above. The present invention is characterized by the magnetization direction of the fixed magnetic layer 3 shown in FIG. 6B.

As shown in FIG. 6B, a magnetization G in the central region of the fixed magnetic layer 3 is fixed in the Y direction (height direction). This is because of the fact that the magnetization G in the central region of the fixed magnetic layer 3 is not greatly influenced by the hard magnetic bias layer 6 owing to a distance from the hard magnetic bias layer 6 that is magnetized in the X direction (track width direction), and is more strongly influenced by the exchange anisotropic magnetic field in the Y direction generated at the interface with the antiferromagnetic layer 2 (refer to FIGS. 1 through 3).

On the contrary, a magnetization H in the end regions of the fixed magnetic layer 3 is fixed in the direction inclined in the X direction in relation to the Y direction. This is because of the fact that the magnetization H in the end regions is easily influenced by the adjacent hard magnetic bias layer 6 that is magnetized in the X direction, in addition to the exchange anisotropic magnetic field in the Y direction.

In the spin-valve type thin film elements shown in FIGS. 1 through 3, when a sensing current is applied from the conductive layer 9 into the fixed magnetic layer 3, the nonmagnetic conductive layer 4, and the free magnetic layer 5, and also, a magnetic field is applied in the Y direction from a recording medium, the magnetization of the free magnetic layer 5 is changed from the X direction to the Y direction. At this stage, electrons that are going to move from one layer to the other layer among the free magnetic layer 5 and the fixed magnetic layer 3 scatter at the interface between the nonmagnetic conductive layer 4 and the fixed magnetic layer 3, or at the interface between the nonmagnetic conductive layer 4 and the free magnetic layer 5, and electrical resistance changes. Accordingly, the sensing current changes and an output can be detected.

In the spin-valve type thin film elements shown in FIGS. 1 and 2, there are two locations in which electron scattering occurs, i.e., at the interface between the nonmagnetic conductive layer 4 and the free magnetic layer 5 and at the interface between the nonmagnetic conductive layer 4 and the fixed magnetic layer 3. In the dual spin-valve type thin film element shown in FIG. 3, there are four locations in which electron scattering occurs, i.e. at the two interfaces between the nonmagnetic conductive layers 4 and the free magnetic layer 5 and at the two interfaces between the nonmagnetic conductive layers 4 and the fixed magnetic layers 3, and therefore, the dual spin-valve type thin film element has a higher rate of resistance variation in comparison with the single spin-valve type thin film element.

The spin-valve type thin film elements 1 shown in FIGS. 1 through 3 are provided on a magnetic lower shield layer 12 formed on a trailing end 11a with a nonmagnetic lower gap layer (not shown in the drawing) therebetween, as shown in FIG. 4. Then, a magnetic upper shield layer 13 is formed on the spin-valve type thin film element 1 with a nonmagnetic upper gap layer (not shown in the drawing) therebetween.

The layers from the lower shield layer 12 to the upper shield layer 13 function as a reading head h1.

The thin film head shown in FIG. 4 is a so-called "combined magnetic head" in which an inductive type magnetic head h2 for writing is deposited on the reading head h1, and the upper shield layer 13 also functions as a lower core layer of the inductive type magnetic head h2.

The structure of the inductive type magnetic head h2 will be described with reference to FIG. 5.

As shown in FIG. 5, a gap layer 14 composed of, for example, aluminum oxide is formed on the lower core layer 13, and a resist layer 15 is formed on the gap layer 14.

A coil layer 16 spirally formed (refer to FIG. 4) is provided on the resist layer 15, and an upper core layer 18 is formed on the coil layer 16 with a resist layer 17 therebetween.

The layers from the lower core layer 13 to the upper core layer 18 function as the inductive type magnetic head h2. A recording current is applied into the coil layer 16, and a recording magnetic field is induced from the coil layer 16 to the lower core layer 13 and the upper core layer 18. A leakage magnetic field between the lower core layer 13 and the upper core layer 18 at a magnetic gap G section enables magnetic signals to be written into a recording medium such as a hard disk.

As described above, the resist layers 15 and 17 are interposed between the coil layer 16 and the lower core layer 13 and between the coil layer 16 and the upper core layer 18, respectively, and insulation is maintained between the coil layer 16 and the core layers 13 and 16 by the resist layers 15 and 17.

In order to improve insulating properties, after the resist layers 15 and 17 are formed, heat treatment or ultraviolet (UV) radiation along with heat treatment is performed to cure the resist layers 15 and 17.

In the present invention, in order to properly fix the magnetization of the fixed magnetic layer 3 after the resist curing step (after heating), a spin-valve type thin film element 1 is formed by a method described below.

First, the laminate including from the under layer 7 to the protective layer 8 shown in FIGS. 1, 2, or 3 is deposited on a lower gap layer (not shown in the drawing).

In the present invention, the antiferromagnetic layer 2 is preferably composed of a Pt—Mn alloy film which has a high blocking temperature of approximately 380° C.

Instead of the Pt—Mn alloy, an X—Mn alloy, where X is an element selected from the group consisting of Pd, Rh, Ru, Ir, and Os, or a Pt—Mn—X alloy, where X is an element selected from the group consisting of Ni, Pd, Rh, Ru, Ir, Cr, and Co, may be used for the antiferromagnetic layer 2.

Next, magnetic annealing is performed in the Y direction to generate an exchange anisotropic magnetic field at the interface between the antiferromagnetic layer 2 and the fixed magnetic layer 3, and the magnetization of the fixed magnetic layer 2 is fixed in the Y direction.

Although, with respect to the Pt—Mn alloy film, an exchange anisotropic magnetic field is generated by magnetic annealing, if an Fe—Mn alloy film or an Ir—Mn alloy film is used for the antiferromagnetic layer 2, an exchange anisotropic magnetic field is generated by depositing in a magnetic field.

Next, both sides of the laminate including from the under layer 7 to the protective layer 8 are scraped off diagonally, as shown in FIGS. 1 through 3, and hard magnetic bias layers 6 and 6 and conductive layers 9 and 9 are deposited on both sides of the laminate.

In the conventional art, hard magnetic bias layers 6 and 6 are magnetized in the X direction (track width direction), however, in the present invention, hard magnetic layers 6 and 6 are magnetized in the Y direction first.

FIG. 6A schematically shows the magnetization state. As shown in FIG. 6A, both a magnetization E of the fixed magnetic layer 3 and a magnetization D of the hard magnetic bias layer 6 are set in the Y direction.

Then, on the spin-valve type thin film element 1, the lower core layer 13, the gap layer 14, and the resist layer 15 shown in FIG. 5 are deposited, and heating is performed to cure the resist layer 15.

In the resist curing step, the temperature is increased slowly from room temperature to approximately 250° C., taking several to several tens of minutes, and is maintained at approximately 250° C. for several tens of minutes.

At this stage, the magnetization E of the fixed magnetic layer remains fixed in the Y direction.

By heating up to 250° C., the exchange anisotropic magnetic field generated at the interface between the fixed magnetic layer 3 and the antiferromagnetic layer 2 decreases, or, if an antiferromagnetic material having a blocking temperature of 250° C. or less is used for the antiferromagnetic layer 2, the exchange anisotropic magnetic field disappears. However, in the present invention, as described above, the hard magnetic bias layers 6 and 6 are magnetized in the Y direction, and the hard magnetic bias layers 6 and 6 have a significantly high Curie temperature (a temperature at which remnant magnetization disappears).

Therefore, even if heating is performed at approximately 250° C., the magnetization D of the hard magnetic bias layers 6 and 6 shown in FIG. 6A is properly set in the Y direction.

Accordingly the magnetization E of the fixed magnetic layer 3 is set in the Y direction under the influence of the magnetization D of the hard magnetic bias layers 6 and 6. Also, as in the present invention, when a Pt—Mn alloy film is used for the antiferromagnetic layer 2, a sufficient exchange anisotropic magnetic field can be obtained even if heated at 250° C., and thus the magnetization E of the fixed magnetic layer 3 can be set in the Y direction more properly.

When the temperature is slowly decreased from approximately 250° C. to room temperature, taking several tens of minutes, an exchange anisotropic magnetic field in the Y direction is generated again at the interface between the fixed magnetic layer 3 and the antiferromagnetic layer 2, and the magnetization E of the fixed magnetic layer 3 is fixed in the height direction.

After the resist layer 15 shown in FIG. 5 is cured, the coil layer 16 is formed, and then the resist layer 17 is formed.

The resist layer 17 is also subjected to the resist curing step as described above in order to cure the resist layer 17.

Then, the upper core layer 18 shown in FIG. 5 is formed on the resist layer 17.

Next, in the present invention, the hard magnetic bias layer 6 is magnetized in the X direction (track width direction) at ambient temperature.

FIG. 6B shows the magnetization direction of the hard magnetic bias layers 6 and 6 and the magnetization direction of the fixed magnetic layer 3 at this stage.

As shown in FIG. 6B, by magnetizing the hard bias layers 6 and 6 in the X direction, the magnetization H of the fixed magnetic layer 3 in the end regions which abut on the hard magnetic bias layer 6 is fixed in the direction inclined in the X direction in relation to the Y direction, however, the magnetization G in the central region of the fixed magnetic layer 3 is properly fixed in the Y direction by an exchange anisotropic magnetic field generated at the interface with the antiferromagnetic layer 2 owing to a distance from the hard magnetic bias layers 6 and 6.

As described above, in accordance with the present invention, the hard magnetic bias layer 6 is magnetized in the Y direction (height direction) before the resist curing step (before heating), and the hard magnetic bias layer 6 is remagnetized in the X direction (track width direction) after the resist curing step (after heating).

Therefore, even if the exchange anisotropic magnetic field generated at the interface between the fixed magnetic layer 3 and the antiferromagnetic layer 2 diminishes or disappears by heating in the resist curing step, the magnetization of the fixed magnetic layer 3 is directed in the Y direction under the influence of the magnetization of the hard magnetic bias layer 6 in the Y direction.

When the temperature is decreased to ambient temperature and exchange coupling is reproduced at the interface between the fixed magnetic layer and the antiferromagnetic layer, the exchange anisotropic magnetic field caused by the exchange coupling is directed in the height direction properly, and thus the magnetization of the fixed magnetic layer is fixed in the height direction.

Then, since the hard magnetic bias layer is remagnetized in the track width direction, the magnetization in the end regions of the fixed magnetic layer is inclined in the track width direction under the influence of the hard magnetic bias layer. However, the magnetization in the central region of the fixed magnetic layer is properly fixed in the height direction by the exchange anisotropic magnetic field directed in the height direction, and therefore, higher output of the head and better asymmetry can be obtained in comparison with the conventional art.

In particular, in accordance with the present invention, a Pt—Mn alloy film is preferably sued as the antiferromagnetic layer. When the Pt—Mn alloy film is used for the antiferromagnetic layer, the exchange anisotropic magnetic field does not disappear even by heating in the resist curing step, and the magnetization of the fixed magnetic layer is properly fixed in the height direction. Therefore, higher output of the head and better asymmetry can be obtained in comparison with the case in which an Fe—Mn alloy film or an Ir—Mn alloy film is used for the antiferromagnetic layer.

EXAMPLE

In the present invention, three types of spin-valve type thin film elements were manufactured using a Pt—Mn alloy film, an Fe—Mn alloy film, and an Ir—Mn alloy film for an antiferromagnetic layer to investigate the dependence on the magnetization direction of a hard magnetic bias layer with respect to playback characteristics in each spin-valve type thin film element.

The spin-valve type thin film elements of the three types had the following film structures in common.

Protective layer: Ta (50)/Free magnetic layer: Ni—Fe (70)/Free magnetic layer: Co (20)/Nonmagnetic conductive layer: Cu (25)/Fixed magnetic layer: Co (30)/Antiferromagnetic layer (250)

The numeric value in parentheses represents a film thickness with a unit of angstrom.

A hard magnetic bias layer in each of the three types was formed using a Co—Pt alloy film having a thickness of 300 angstroms. The Co—Pt alloy film had a coercive force of 1,500 oersteds (Oe), a remnant magnetization (Mr) of 1.0 tesla (T), and a Curie temperature of 700° C.

The Pt—Mn alloy film, the Fe—Mn alloy film, and the Ir—Mn alloy film used for the antiferromagnetic layer had composition ratios of (Pt:Mn)=(50:50), (Fe:Mn)=(50:50), and (Ir:Mn)=(25:75), respectively.

The Pt—Mn alloy film had a blocking temperature of approximately 380° C., the Fe—Mn alloy film had a blocking temperature of approximately 150° C., and the Ir—Mn alloy film had a blocking temperature of approximately 260° C.

Testing was performed with respect to three patterns including a case in which a hard magnetic bias layer of each spin-valve type thin film element is not magnetized (conventional example 1), a case in which it is magnetized in the track width direction (conventional example 2), and a case in which it is magnetized in the height direction (example). The spin-valve type thin film elements were heated under the same conditions as those in the resist curing step. An external magnetic field for magnetizing the hard magnetic bias layer had an intensity of 1,000 Oe.

The temperature was increased from room temperature to 250° C., taking approximately 15 minutes, retained at 250° C. for approximately 15 minutes, and decreased to room temperature, taking approximately 30 minutes.

An external magnetic field having an intensity of 1,000 Oe was applied onto the spin-valve type thin film elements in the conventional example 1 (in which the hard magnetic bias layer was not magnetized) and in the example (in which the hard magnetic bias layer was magnetized in the height direction) to magnetize the hard magnetic bias layers in the track width direction.

The output of the head (normalized value) and asymmetry of the head (observed value) were measured. The results are shown in Table 1.

TABLE 1

|  | Magnetization direction of hard magnetic bias layer | Output of the head (Normalized value) | | | Asymmetry of the head (Observed value) % | | |
| --- | --- | --- | --- | --- | --- | --- | --- |
|  |  | $Fe_{50}Mn_{50}$ Ave | $Ir_{25}Mn_{75}$ Ave | $Pt_{50}Mn_{50}$ Ave | $Fe_{50}Mn_{50}$ Ave/σ | $Ir_{25}Mn_{75}$ Ave/σ | $Pt_{50}Mn_{50}$ Ave/σ |
| Conventional Example 1 | Random | 20 | 50 | 97 | −30/25 | −20/15 | −6/3 |
| Conventional Example 2 | Track width direction | 10 | 40 | 95 | −35/30 | −25/20 | −8/4 |
| Present Invention (Example) | Height direction | 40 | 70 | 100 | −20/15 | −15/10 | +1/1 |

The output of the head shown in Table 1 is the ratio to the output of the head, as 100, when $Pt_{50}Mn_{50}$ is used for the antiferromagnetic layer and the hard magnetic bias layer is magnetized in the height direction.

"Ave" in the Asymmetry column represents a value of asymmetry, and "σ" represents the standard deviation. It is preferable that both the asymmetry and the standard deviation be close to 0(%).

As shown in Table 1, in all cases when $Fe_{50}Mn_{50}$ was used, $Ir_{25}Mn_{75}$ was used, and $Pt_{50}Mn_{50}$ was used, for the antiferromagnetic layer, it is preferable that the hard magnetic bias layer be magnetized in the height direction in order to obtain a high output of the head and good asymmetry.

Among $Fe_{50}Mn_{50}$, $Ir_{25}Mn_{75}$, and $Pt_{50}Mn_{50}$, when the hard magnetic bias layer was magnetized in the height direction, $Pt_{50}Mn_{50}$ had the highest output of the head and the best asymmetry.

The reason for the above is that $Pt_{50}Mn_{50}$ has a higher blocking temperature (approximately 380° C.) than that of $Fe_{50}Mn_{50}$ (approximately 170° C.) or that of $Ir_{25}Mn_{75}$ (approximately 260° C.).

As described above, in accordance with the present invention, when an inductive type magnetic head for writing is deposited on a spin-valve type thin film element, by magnetizing a hard bias magnetic layer of the spin-valve type thin film element in the height direction before the resist curing step (before heating), the magnetization of a fixed magnetic layer can continue to be set in the height direction even if an exchange anisotropic magnetic field diminishes or disappears owing to heating.

Accordingly, when the temperature is decreased and exchange coupling is reproduced, an exchange anisotropic magnetic field caused by the exchange coupling is set in the height direction, and thus the magnetization of the fixed magnetic layer can be properly fixed in the height direction.

Then, since the hard magnetic bias layer is magnetized in the track width direction, the magnetization in the end regions of the fixed magnetic layer is inclined in the track width direction in relation to the height direction under the influence of the hard magnetic bias layer, however, the magnetization in the central region of the fixed magnetic layer, which is distant from the hard magnetic bias layer, is properly fixed in the height direction. Therefore, higher output of the head and better asymmetry can be obtained in comparison with the conventional art.

In particular, in accordance with the present invention, a Pt—Mn alloy film is preferably used as the antiferromagnetic layer. The Pt—Mn alloy film has a higher blocking temperature than that of an Fe—Mn alloy film or the like that has been used as the antiferromagnetic layer, and thus a sufficient exchange anisotropic magnetic field can be obtained even if heating is performed in the resist curing step, and the magnetization of the fixed magnetic layer can be more properly fixed in the height direction.

What is claimed is:

1. A method of manufacturing a spin-valve type thin film element comprising:

forming a laminate comprising an antiferromagnetic layer, a fixed magnetic layer, a nonmagnetic conductive layer, and a free magnetic layer, and fixing the magnetization of said fixed magnetic layer in the height direction by exchange coupling with said antiferromagnetic layer;

forming a bias layer on both sides of said laminate, and magnetizing said bias layer in the height direction;

heating said laminate and said bias layer; and applying a magnetic field in the track width direction after said heating to remagnetize said bias layer in the track width direction.

2. A method of manufacturing a spin-valve type thin film element according to claim 1, further comprising forming an inductive type magnetic head on said thin film element, wherein said heating is performed in order to cure a resist layer, said resist layer being an insulating layer of the inductive type magnetic head.

3. A method of manufacturing a spin-valve type thin film element according to claim 2, wherein said heating is performed at a temperature lower than the blocking temperature of said antiferromagnetic layer.

4. A method of manufacturing a spin-valve type thin film element according to claim 3, wherein said antiferromagnetic layer comprises a Pt—Mn alloy film.

5. A method of manufacturing a spin-valve type thin film element according to claim 3, wherein said antiferromagnetic layer comprises an X—Mn alloy, where X is an element selected from the group consisting of Pd, Rh, Ru, Ir, and Os.

6. A method of manufacturing a spin-valve type thin film element according to claim 3, wherein said antiferromagnetic layer comprises a Pt—Mn—X alloy, where X is an element selected from the group consisting of Ni, Pd, Rh, Ru, Ir, Cr, and Co.

7. A method of manufacturing a spin-valve type thin film element according to claim 1, wherein said heating is performed at a temperature lower than the blocking temperature of said antiferromagnetic layer.

8. A method of manufacturing a spin-valve type thin film element according to claim 7, wherein said antiferromagnetic layer comprises a Pt—Mn alloy film.

9. A method of manufacturing a spin-valve type thin film element according to claim 7, wherein said antiferromagnetic layer comprises an X—Mn alloy, where X is an element selected from the group consisting of Pd, Rh, Ru, Ir, and Os.

10. A method of manufacturing a spin-valve type thin film element according to claim 7, wherein said antiferromagnetic layer comprises a Pt—Mn—X alloy, where X is an element selected from the group consisting of Ni, Pd, Rh, Ru, Ir, Cr, and Co.

* * * * *